United States Patent
Yang et al.

(10) Patent No.: US 8,168,924 B2
(45) Date of Patent: May 1, 2012

(54) OVERHEAT PROTECTION CONTROL COMPONENT FOR LIQUID HEATING VESSEL

(75) Inventors: Qiang Yang, Zhejiang (CN); Hesheng Zheng, Zhejiang (CN); Yu Yan, Zhejiang (CN)

(73) Assignee: Zhejiang Jiatai Electrical Appliance Co., Ltd., Hongqiao Town, Yueqing, Zhejiang (CN)

( * ) Notice: Subject to any disclaimer, the term of this patent is extended or adjusted under 35 U.S.C. 154(b) by 283 days.

(21) Appl. No.: 12/671,029

(22) PCT Filed: Jul. 7, 2008

(86) PCT No.: PCT/CN2008/001280
§ 371 (c)(1),
(2), (4) Date: Jan. 27, 2010

(87) PCT Pub. No.: WO2009/049466
PCT Pub. Date: Apr. 23, 2009

(65) Prior Publication Data
US 2010/0200564 A1    Aug. 12, 2010

(30) Foreign Application Priority Data

Oct. 14, 2007   (CN) .......................... 2007 1 0156092

(51) Int. Cl.
*F27D 11/00*   (2006.01)
*H05B 1/02*    (2006.01)

(52) U.S. Cl. ........ 219/441; 219/437; 219/438; 219/385; 219/386; 219/429; 219/432; 219/433; 219/216; 219/469; 219/494; 219/542; 219/543; 219/548; 392/497; 392/498; 392/499; 392/459; 392/447

(58) Field of Classification Search .................. 219/441, 219/437–8, 385–6, 429, 432–3, 216, 469, 219/494, 542–3, 548; 392/497–9, 459, 447
See application file for complete search history.

(56) References Cited

U.S. PATENT DOCUMENTS 3,500,277 A * 3/1970 Nardulli ........................ 337/343
5,274,525 A * 12/1993 Le Meur ....................... 361/105

* cited by examiner

*Primary Examiner* — Shawntina Fuqua
(74) *Attorney, Agent, or Firm* — Global IP Services; Tianhua Gu

(57) ABSTRACT

The invention provides an overheat protection control component for a liquid heating vessel which includes a control body (1); a single-integrated dual-actuation thermally sensitive bimetallic actuator (2) is provided on the upper face of the control body (1), wherein the single-integrated dual-actuation thermally sensitive bimetallic actuator (2) is two integrated and relatively independent actuating units which are formed on a piece of bimetallic strip, and the outer kick limb (3) of either said actuating unit will produce an actuating movement downwards when an overheat state occurs; two groups of switch contacts (6) are also provided on the control body (1), wherein either group of switch contacts (6) cooperate with the outer kick limb (3) of a corresponding actuating unit, and the outer kick limb (3), when producing a downward actuating movement, will open a corresponding group of switch contacts (6) and cut off the power supply of the heater for the liquid heating vessel.

6 Claims, 1 Drawing Sheet

OVERHEAT PROTECTION CONTROL COMPONENT FOR LIQUID HEATING VESSEL

The present application is the US national stage of PCT/CN2008/001280 filed on Jul. 7, 2008, which claims the priority of the Chinese patent application No. 200710156092.2 filed on Oct. 14, 2007, which application is incorporated herein by reference.

FIELD OF THE INVENTION

The present invention relates to an overheat protection control means, and more particularly, to an overheat protection control component for a liquid heating vessel.

BACKGROUND OF THE INVENTION

The existing overheat protection control means (also called boil-dry protection control means) for liquid heating vessels are mostly used and mounted under the bases of liquid heating vessels, especially water boiling vessels, wherein the base of said vessel is provided with an electrical heating element. There are mainly two types of such overheat protection control means: one type provided with only one thermally sensitive bimetallic actuator, and the other type provided with two thermally sensitive bimetallic actuators. Because the first type has only one actuator, if it goes wrong or fails to operate, the heating vessel is easy to boil dry and overheat and then be burned out. On the other hand, because the two actuators of the second type are made of different materials, the two actuators will operate at different temperatures. Wherein the actuator operable at a higher temperature will produce an actuating movement when the temperature of the heating vessel is too high, that results in overheating and burning out the heating vessel; while the actuator operable at a lower temperature is easy to produce an actuating movement when the temperature of the heating vessel is not high, that results in influencing the normal use of the heater.

SUMMARY OF THE INVENTION

An object of the present invention is to provide an overheat protection control component for a liquid heating vessel, characterized by reliable overheat protection and accurate and consistent actuations.

In order to achieve the above object, the following technical solution is provided in the present invention: an overheat protection control component for a liquid heating vessel includes a control body; a single-integrated dual-actuation thermally sensitive bimetallic actuator is provided on the upper face of the control body, wherein the single-integrated dual-actuation thermally sensitive bimetallic actuator is two integrated and relatively independent actuating units which are formed on a piece of bimetallic strip, either said actuating unit includes its own outer kick limb, internal tongue and tongue root that connects the outer kick limb and the internal tongue, the tongue roots of said two actuating units are close to each other and are integrated, the tongue tip of the internal tongue and the outer kick limb of one said actuating unit is remote from the tongue tip and the outer kick limb of the other actuating unit, the single-integrated dual-actuation thermally sensitive bimetallic actuator is provided on the control body via the internal tongues thereof, and the outer kick limb of either said actuating unit will produce an actuating movement downwards when an overheat state occurs; two groups of switch contacts are also provided on the control body, wherein either group of switch contacts cooperate with the outer kick limb of a corresponding actuating unit, and the outer kick limb, when producing a downward actuating movement, will open a corresponding group of switch contacts and cut off the power supply of the heater for the liquid heating vessel.

In the above technical solution, the thermally sensitive actuator mounted on the control body and cooperating with the switch contacts is a single-integrated dual-actuation thermally sensitive bimetallic actuator, which functionally provides a reliable dual-overheat protection since it comprises two actuating units. Meanwhile, since the two actuating units are obtained by forming them on the same piece of bimetallic strip at adjoining locations abutting each other, the material and actuating temperature of the two will be highly consistent, i.e. they may produce actuating movements at the same accurate temperature point; moreover, since the two actuating units are integrated, it is convenient to assemble them and the assembly efficiency of the control component can be improved as well. On the premise of reliable overheat protection, a control component with such structure may be designed to be more compact to thereby save material, and a compact heating vessel with reliable overheat protection can be produced. Because the tongue roots of the two actuating units are close to each other while their outer kick limbs are remote from each other, it may be ensured that each of their outer kick limbs can produce a downward actuating movement independently and elastically, and also that the two groups of corresponding switch contacts are spaced apart properly and safely.

DETAILED DESCRIPTION OF THE PREFERRED EMBODIMENT

The invention is further described in detail hereinafter, by way of example, with reference to the drawings.

Wherein, 1 control body; 2 single-integrated dual-actuation thermally sensitive bimetallic actuator; 3 outer kick limb; 4 internal tongue; 5 tongue root; 6 switch contact; 7 push rod; 8 retaining plate; 9 hole for internal tongue; and 10 rivet.

Figure 1:
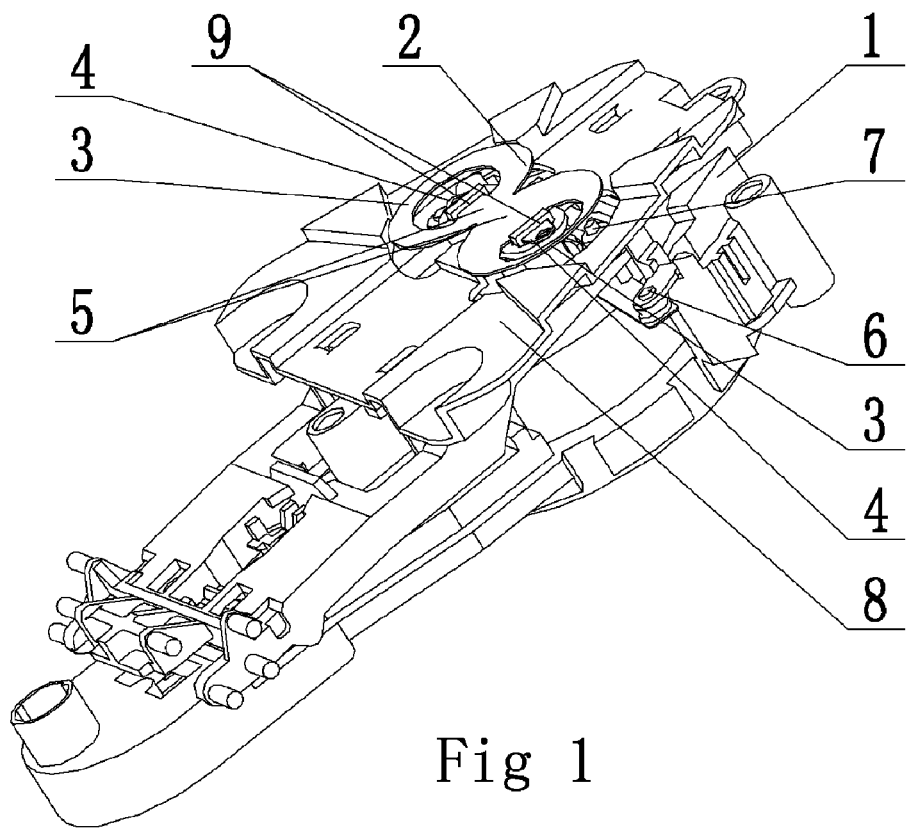
FIG. 1 is a schematic view showing the 3D structure of one embodiment of the overheat protection control component for a liquid heating vessel provided in the present invention.
Figure 2:
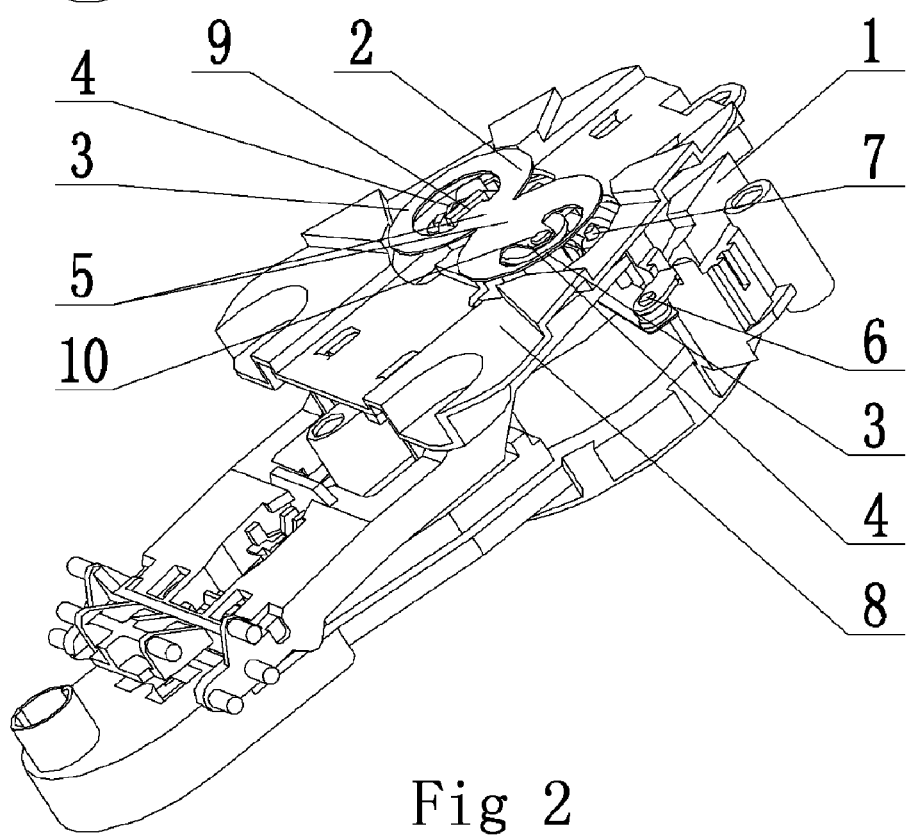
FIG. 2 is a schematic view showing the 3D structure of another embodiment of the overheat protection control component for a liquid heating vessel provided in the present invention.

As shown in FIG. 1 and FIG. 2, the overheat protection control component for a liquid heating vessel includes a control body 1; a single-integrated dual-actuation thermally sensitive bimetallic actuator 2 is provided on the upper face of the control body 1, wherein the single-integrated dual-actuation thermally sensitive bimetallic actuator 2 is two integrated and relatively independent actuating units which are formed on a piece of bimetallic strip, either said actuating unit includes its own outer kick limb 3, internal tongue 4 and tongue root 5 that connects the outer kick limb 3 and the internal tongue 4, the tongue roots 5 of said two actuating units are close to each other and are integrated, the tongue tip of the internal tongue 4 and the outer kick limb 3 of one said actuating unit is remote from the same of the other actuating unit, the single-integrated dual-actuation thermally sensitive bimetallic actuator 2 is provided on the control body 1 via the internal tongues 4 thereof, and the outer kick limb 3 of either said actuating unit will produce an actuating movement downwards when an overheat state occurs; two groups of switch contacts 6 are also provided on the control body 1, wherein either group of switch contacts 6 cooperate with the outer kick limb 3 of a corresponding actuating unit, and the outer kick limb 3, when producing a downward actuating movement, will open a corresponding group of switch contacts 6 and cut off the power supply of the heater for the liquid heating vessel. Wherein, in FIG. 1, the internal tongues 4 of the single-integrated dual-actuation thermally sensitive bimetallic actuator 2 are mounted within the holes for internal tongues 9 in the retaining plate 8 of the control body 1; whereas, in FIG. 2, one internal tongue 4 of the single-integrated dual-actuation thermally sensitive bimetallic actuator 2 is inserted into the hole for internal tongue 9 in the retaining plate 8 provided on the upper face of the control body 1, while the other internal tongue 4 is riveted to the retaining plate 8 provided on the upper face of the control body 1 via a rivet 10. The object of the invention can be achieved using any of the two installation modes shown in FIG. 1 and FIG. 2, respectively.

As shown in FIG. 1 and FIG. 2, when the orientations of the internal tongues 4 of the two actuating units of the single-integrated dual-actuation thermally sensitive bimetallic actuator 2 form an angle of 180°, in the case of ensuring the integration and relevance of the two actuating units, since the two internal tongues 4 are in a straight line, the two outer kick limbs 3 accordingly can be remote from each other to the utmost extent so as to show the independency and elasticity of the two outer kick limbs 3 more greatly; on the other hand, when the orientations of the internal tongues 4 of the two actuating units of the single-integrated dual-actuation thermally sensitive bimetallic actuator 2 form an angle of more than 150° and less than 180°, the two outer kick limbs 3 can also be staggered at a large angle and be remote from each other so as to show the independency and elasticity of the two outer kick limbs 3 better.

In the overheat protection control component shown in FIG. 1 and FIG. 2, a push rod 7 is further disposed between either group of switch contacts 6 and a corresponding outer kick limb 3. The downward actuating movement of the outer kick limb 3 pushes the push rod 7 to move and the movement of the push rod 7 opens the switch contact 6, which is, the actuating movement of the outer kick limb 3 opens the switch contact 6 via the push rod 7. Wherein, the downward actuating movement of the outer kick limb 3 will bring the push rod 7 to push downwards the lower moveable piece of the switch contact 6 so that the lower moveable piece is detached from the upper fixed piece of the switch contact 6 to thereby cut off the power supply of the heater for the liquid heating vessel. In this way, when an overheat state occurs, the movement of the actuator can be reliably and effectively transmitted to the switch contact 6 while spacing the switch contact 6 apart from the actuating element abutting against the heating element for a certain distance, thereby preventing the switch contact 6 from working in a high-temperature area and ensuring the operational reliability and useful life of the switch contact 6. Of course, the actuating movement of the actuating element can also open the switch contact 6 in other forms and achieve the object of the invention. The other forms also fall into the scope of protection of the invention.

What is claimed is:

1. An overheat protection control component for a liquid heating vessel, comprising:

a control body (1);

a single-integrated dual-actuation thermally sensitive bimetallic actuator (2) provided on an upper face of the control body (1), wherein the single-integrated dual-actuation thermally sensitive bimetallic actuator (2) is two integrated and relatively independent actuating units which are formed on a piece of bimetallic strip, either said actuating unit includes its own outer kick limb (3), internal tongue (4) and tongue root (5) that connects the outer kick limb (3) and the internal tongue (4), the tongue roots (5) of said two actuating units are close to each other and are integrated, the tongue tip of the internal tongue (4) and the outer kick limb (3) of said one actuating unit is remote from the same of the other actuating unit, the single-integrated dual-actuation thermally sensitive bimetallic actuator (2) is provided on the control body (1) via the internal tongues (4) thereof, and the outer kick limb (3) of either said actuating unit will produce an actuating movement downwards when an overheat state occurs;

two groups of switch contacts (6) further provided on the control body (1), wherein either group of switch contacts (6) cooperate with the outer kick limb (3) of a corresponding actuating unit, and the outer kick limb (3), when producing a downward actuating movement, will open a corresponding group of switch contacts (6) and cut off the power supply of the heater for the liquid heating vessel.

2. The overheat protection control component for a liquid heating vessel of claim 1, characterized in that orientations of the internal tongues (4) of the two actuating units of the single-integrated dual-actuation thermally sensitive bimetallic actuator (2) form an angle of 180°.

3. The overheat protection control component for a liquid heating vessel of claim 1, characterized in that orientations of the internal tongues (4) of the two actuating units of the single-integrated dual-actuation thermally sensitive bimetallic actuator (2) form an angle of more than 150° and less than 180°.

4. The overheat protection control component for a liquid heating vessel of claim 1 or 2, characterized in that the internal tongue (4) of one actuating unit of the single-integrated dual-actuation thermally sensitive bimetallic actuator (2) is inserted into a hole for internal tongue (9) on an upper face of the control body (1), and the internal tongue (4) of the other actuating unit is riveted to the upper face of the control body (1).

5. The overheat protection control component for a liquid heating vessel of claim 1 or 2, characterized in that a push rod (7) is further disposed between either group of switch contacts (6) and a corresponding outer kick limb (3), a downward actuating movement of the outer kick limb (3) pushing the push rod (7) to move and the movement of the push rod (7) opening the switch contact (6).

6. The overheat protection control component for a liquid heating vessel of claim 4, characterized in a push rod (7) is further disposed between either group of switch contacts (6) and a corresponding outer kick limb (3), the downward actuating movement of the outer kick limb (3) pushing the push rod (7) to move and the movement of the push rod (7) opening the switch contact (6).

\* \* \* \* \*